US009525772B2

(12) United States Patent
Rohlfing et al.

(10) Patent No.: US 9,525,772 B2
(45) Date of Patent: Dec. 20, 2016

(54) IDENTIFYING LINE FAULTS USING REGRESSION ANALYSIS ON NEAR AND FAR END ERRORS (71) Applicant: BRITISH TELECOMMUNICATIONS PUBLIC LIMITED COMPANY, London (GB)

(72) Inventors: David Michael Rohlfing, London (GB); Philip Martin Bull, London (GB); Paul Robert Benyon, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/778,433

(22) PCT Filed: Mar. 5, 2014

(86) PCT No.: PCT/GB2014/000064
§ 371 (c)(1),
(2) Date: Sep. 18, 2015

(87) PCT Pub. No.: WO2014/147357
PCT Pub. Date: Sep. 25, 2014

(65) Prior Publication Data
US 2016/0277564 A1 Sep. 22, 2016

(30) Foreign Application Priority Data
Mar. 20, 2013 (EP) ..................... 13250032

(51) Int. Cl.
H04M 1/24 (2006.01)
H04M 3/08 (2006.01)
(Continued)

(52) U.S. Cl.
CPC ......... *H04M 3/2209* (2013.01); *H04M 7/0024* (2013.01)

(58) Field of Classification Search
CPC ..... H04B 1/1027; H04B 3/32; H04B 10/0799; H04B 10/564; H04L 1/20; H04L 12/2856; H04L 12/2861; H04L 12/2885; H04L 41/0213; H04L 41/0681; H04L 41/0803; H04L 41/0853; H04L 41/141; H04M 11/062
(Continued)

(56) References Cited

U.S. PATENT DOCUMENTS 5,787,074 A * 7/1998 Brownmiller ............. H04J 3/14
370/244
5,796,723 A * 8/1998 Bencheck ................. H04J 3/14
370/252
(Continued)

FOREIGN PATENT DOCUMENTS

EP 2 216 972 8/2010

OTHER PUBLICATIONS

International Search Report for PCT/GB2014/000064, mailed May 16, 2014, 5 pages.
(Continued)

*Primary Examiner* — Binh Tieu
(74) *Attorney, Agent, or Firm* — Nixon & Vanderhye P.C.

(57) ABSTRACT

The invention presents a method of identifying faults on a DSL line, typically intermittent faults arising from unstable joints in the DSL line. The method collects errored seconds data at the DSLAM and at the customer's premises equipment (CPE, typically a home hub or router). The error data collected at the DSLAM are termed near-end errors, and the error data collected at the CPE are termed far-end errors. The near-end and far-end data is then analyzed by applying
(Continued)

regression analysis to determine if there is a correlation or match between the two sets of data. Matching data patterns are indicative of unstable or bad joints in the DSL line, and are typically intermittent and located near the customer's premises.

8 Claims, 8 Drawing Sheets

(51) Int. Cl.
*H04M 3/22* (2006.01)
*H04M 7/00* (2006.01)

(58) Field of Classification Search
USPC ............ 379/1.01, 1.03, 1.04, 9, 9.03, 10.01, 379/15.01, 22.03, 22.04, 24, 27.01, 29.01, 379/29.1
See application file for complete search history.

(56) References Cited

U.S. PATENT DOCUMENTS

| 7,924,736 B2* | 4/2011 | Cioffi | H04L 41/0803 370/241 |
| 8,428,225 B2* | 4/2013 | Cioffi | H04B 1/1027 379/1.04 |
| 9,071,534 B2* | 6/2015 | Cioffi | H04L 41/0803 |
| 2007/0109974 A1* | 5/2007 | Cutillo | H04L 12/2856 370/254 |
| 2014/0093233 A1* | 4/2014 | Gao | H04B 10/0799 398/16 |
| 2014/0098705 A1* | 4/2014 | Chow | H04L 12/2898 370/254 |

OTHER PUBLICATIONS

Yang, et al., "Method and System of Performance Monitoring to Detect VDSL Service Degradation", 2010 International Conference on Cyber-Enabled Distributed Computing and Knowledge Discovery, Oct. 10, 2010 (pp. 468-475 8 pages).

Yemini, et al., "High Speed and Robust Event Correlation", IEEE Communications Magazine, IEEE Service Center, vol. 34, No. 5, May 1, 1996 (9 pages).

* cited by examiner

| Time bin | Bin number | NE ES | FE ES |
|---|---|---|---|
| 00:00 | 1 | 8 | 14 |
| 00:15 | 2 | 0 | 4 |
| 00:30 | 3 | 0 | 0 |
| 00:45 | 4 | 0 | 0 |
| 01:00 | 5 | 7 | 13 |
| 01:15 | 6 | 0 | 0 |
| 01:30 | 7 | 1 | 3 |
| 01:45 | 8 | 4 | 4 |
| 02:00 | 9 | 0 | 0 |
| 02:15 | 10 | 0 | 0 |
| 02:30 | 11 | 0 | 1 |
| 02:45 | 12 | 0 | 0 |
| 03:00 | 13 | 0 | 2 |
| 03:15 | 14 | 0 | 0 |
| 03:30 | 15 | 5 | 10 |
| 03:45 | 16 | 0 | 0 |
| 04:00 | 17 | | |
| ... | ... | ... | ... |
| 23:30 | 95 | 0 | 0 |
| 23:45 | 96 | 0 | 0 |

Figure 3

| Time bin | Bin number | NE ES | FE ES |
|---|---|---|---|
| 00:00 | 1 | 2 | 0 |
| 00:15 | 2 | 0 | 0 |
| 00:30 | 3 | 0 | 0 |
| 00:45 | 4 | 0 | 0 |
| 01:00 | 5 | 0 | 0 |
| 01:15 | 6 | 0 | 0 |
| 01:30 | 7 | 0 | 0 |
| 01:45 | 8 | 0 | 0 |
| 02:00 | 9 | 7 | 0 |
| 02:15 | 10 | 0 | 0 |
| 02:30 | 11 | 0 | 0 |
| 02:45 | 12 | 0 | 0 |
| 03:00 | 13 | 0 | 0 |
| 03:15 | 14 | 0 | 0 |
| 03:30 | 15 | 0 | 0 |
| 03:45 | 16 | 0 | 0 |
| 04:00 | 17 | | |
| ... | ... | ... | ... |
| 23:30 | 95 | 0 | 7 |
| 23:45 | 96 | 0 | 22 |

|  | $r^2 <= r2\_threshold$ | $r^2 > r2\_threshold$ |
|---|---|---|
| $b <= b\_threshold$ | no match – line ok | no match – line ok |
| $b > b\_threshold$ | no match – line ok | match – fault on line |

Figure 9a

|  | $r^2 <= r2\_threshold\_low$ | $r2\_threshold\_low < r2 <= r2\_threshold\_high$ | $r^2 > r2\_threshold\_high$ |
|---|---|---|---|
| $b <= b\_threshold$ | no match – line ok | no match – line ok | no match – line ok |
| $b > b\_threshold$ | no match – line ok | match – potential fault | match – fault |

Figure 9b

IDENTIFYING LINE FAULTS USING REGRESSION ANALYSIS ON NEAR AND FAR END ERRORS

This application is the U.S. national phase of International Application No. PCT/GB2014/000064 filed 5 Mar. 2014, which designated the U.S. and claims priority to EP Patent Application No. 13250032.3 filed 20 Mar. 2013, the entire contents of each of which are hereby incorporated by reference.

FIELD OF THE INVENTION

This invention relates to a method of identifying a fault in a digital subscriber line in a telecommunications network, in particular a method of identifying intermittent faults, such as unstable joints in the metallic pair of a digital subscriber line.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an ISP.

Broadband lines are prone to faults. These result in slow line speeds or line drop outs, affecting a customer's service. Some of these faults are easily identified and rectified, such as missing micro-filters in the customer's home. Others are more complex, such as when a line is suffering from degradations in the copper pair at joints between wires or in the insulation surrounding the wires. Various techniques have been developed to help identify such faults.

One known method is to employ metallic line tests, where line test equipment at the telephone exchange runs various line tests. These are typically electrical tests, and the resulting measurements, such as resistance, capacitance and so on, are used to look for various line conditions on the metallic path. Such tests are intended to identify PSTN faults, and can lack sensitivity to fault conditions that affect broadband. Indeed, some of the testing will mask certain faults, as in certain situations the test itself can clear the fault condition as a result of the voltages being applied to the lines. Such testing also requires that specialist test equipment be connected to the line, requiring PSTN and DSL services to be temporarily disabled whilst the testing takes place. The test equipment typically requires some sort of relay to switch in and those relays tend to have a limited lifespan.

Moreover, metallic line tests also have difficulty with intermittent faults, which by their very nature, may not exhibit any fault characteristics at the time of testing.

"Method and System of Performance Monitoring to Detect VDSL Service Degradation", by Charlie Chen-Yui Yang et al, 2010 International Conference on Cyber-Enabled Distributed Computing and Knowledge Discovery, IEEE, 10 Oct. 2010, pages 468-475, describes automated means to predicatively detect service degradation signatures or symptoms of VDSL based on performance monitoring measurements. It describes a management structure and methodology for trouble sectionalisation and isolation to verify and confirm problem locations.

SUMMARY OF THE INVENTION

It is the aim of embodiments of the present invention to provide an improved method of identifying faults in a digital subscriber line in the telecommunications network.

According to one aspect of the present invention, there is provided a method of identifying a fault in a digital subscriber line in a telecommunications network, said method comprising: determining near-end error instances and far-end error instances associated with the digital subscriber line measured over a period of time; determining the correlation between the near-end error instances and the far-end error instances; identifying a fault on the digital subscriber line in dependence on the determined degree of correlation.

The correlation may comprise performing regression analysis on the near end and far end error instances to determine a quality of fit parameter. The error instances are typically errored seconds. Further, an errored second can be defined as a second of data transmission on the digital subscriber line where an uncorrectable error has occurred.

The period of time may comprise a plurality of time bins, with a value for the near-end error instances and a value for the far-end error instances associated with each The error instances may be counts of error occurrences associated with each time bin.

The near-end error instances may be error instances measured at the network end of the digital subscriber line, and the far-end error instances are the error instances measured at the customer end of the digital subscriber line.

Identifying a fault may further comprise comparing the determined correlation to a threshold.

The invention has the advantage of not requiring any specialist test equipment. Further, the measurements required are taken from the DSLAM, and the customer's modem, without disrupting any of the services provided to the customer. Also, as the measurements can be gathered continuously, certain line faults can be identified immediately.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of identifying faults on a DSL line, typically intermittent faults arising from unstable joints in the DSL line. The method collects errored seconds data at the DSLAM and at the customer's premises equipment (CPE, typically a home hub or router). The error data collected at the DSLAM are termed near-end errors, and the error data collected at the CPE are termed far-end errors. The near-end and far-end data is then analysed to determine if there is a correlation or match between the two sets of data. Matching data patterns are indicative of unstable or bad joints in the DSL line, and are typically intermittent and located near the customer's premises.

Figure 1:
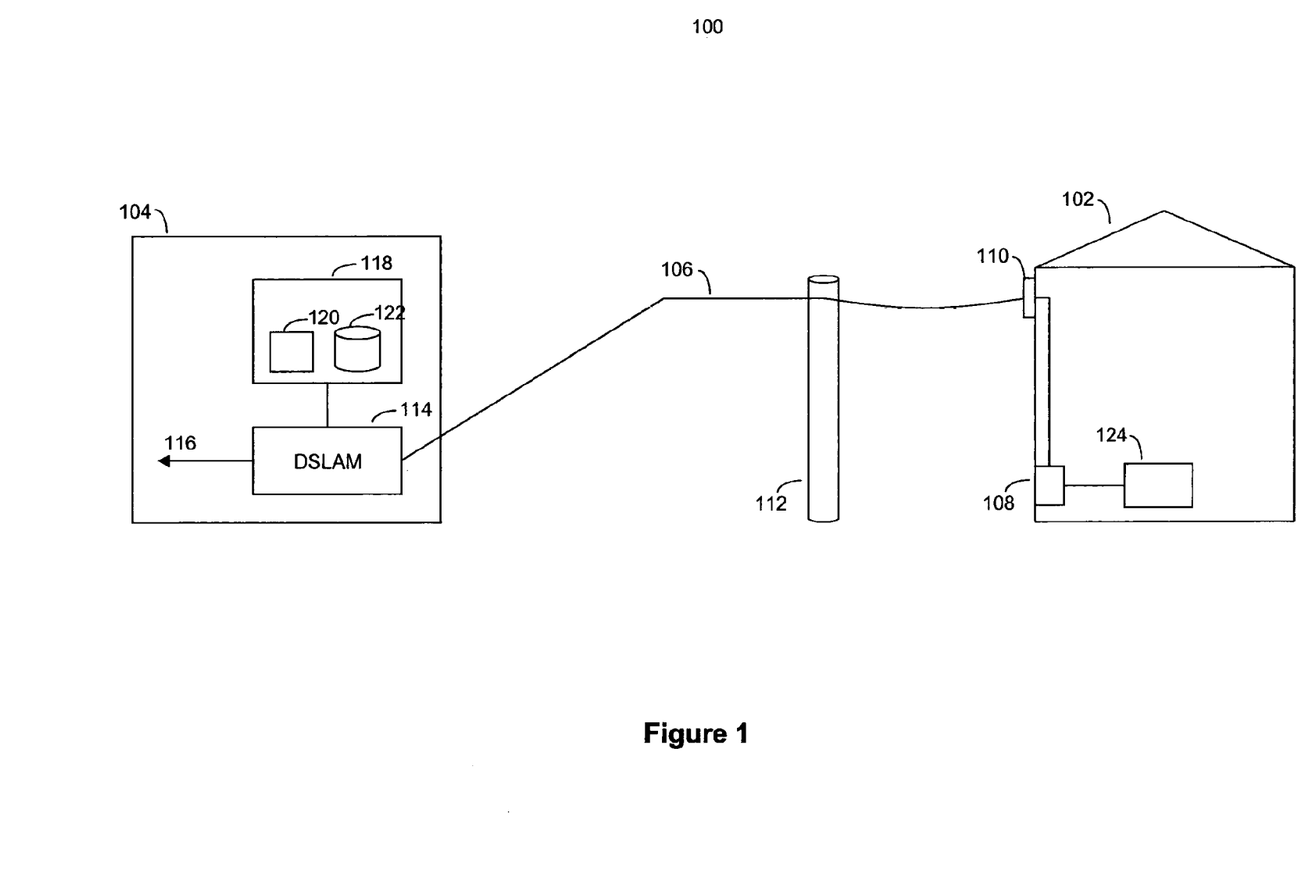
FIG. 1 is a system diagram showing a telephone exchange and a digital subscriber line running to a customer premises.

FIG. 1 illustrates a telecommunications network 100 including a customer's premises 102. The customer's premises 102 is connected to a telephone exchange 104 via a telephone line 106. The telephone line is a twisted copper or aluminium pair of wires. Specifically, a network termination equipment NTE 108 is at the customer premises 102 end of the line 106. The NTE 108 is often referred to as a line box or master socket, and is the demarcation point between the telephone network and the customer wiring in the customer premises 102. The line 106 runs from the NTE 108 to a junction box 110, and then onto a distribution point DP 112. In this example, the DP 112 is a junction on a telephone pole. The line 106 then continues onto the exchange 104 where it terminates a digital subscriber line access multiplexer, DSLAM, 114. Within the customer premises 102, the NTE 108 is connected to customer premises equipment CPE 124, typically a router or home hub.

The DSLAM is a network element that provides digital subscriber line (DSL) services to connected lines and associated customer premises. The line 106 is thus also referred to as digital subscriber line, or DSL line. At the exchange is also a fault detection unit 118, connected to the DSLAM 114. The fault detection unit 118 comprises a processor 120, and a data store 122, such as hard disk array or similar. The fault detection unit 118 gathers various measurements made by the DSLAM 114, stores them in the data store 122, and the processor 120 use the stored measurements determine when a line is exhibiting a fault.

The DSLAM 114 also has onward connections 116 to data provisioning networks. A skilled person will also appreciate that there are other elements in the exchange 104, such as elements that provide standard PSTN services to connected lines. However, these have been omitted for simplicity.

Whilst the present example shows a DSLAM residing in the exchange 104, the invention would still be applicable to configurations where the DSLAM is situated somewhere else. For example, in a fibre to the cabinet (FTTC) arrangement, the DSLAM 114 would be located in a roadside cabinet, which is typically located nearer the customer premises than the exchange. In an alternative network arrangement, DSLAM like functionality can be provided by an MSAN (multi services access node), which also provides other capabilities such as voice.

When the DSLAM 114 converts signals transmitted by the modem in the CPE 124, the DSLAM also records how many seconds of the transmission contained errors that result in corrupted information. This parameter is referred to as the near-end errored seconds. Similarly, errored seconds recorded by the CPE 124 as it converts signals received from the DSLAM 114 are referred to as far-end error seconds. The near-end and far-end errored seconds are being constantly recorded, and thus a picture of the errored seconds can be plotted over time. The near and far-end error seconds are recorded continuously as part of the routine operation of the DSLAM, and thus non-intrusive, unlike testing where service might have to be interrupted to activate specific line tests.

Figure 2:
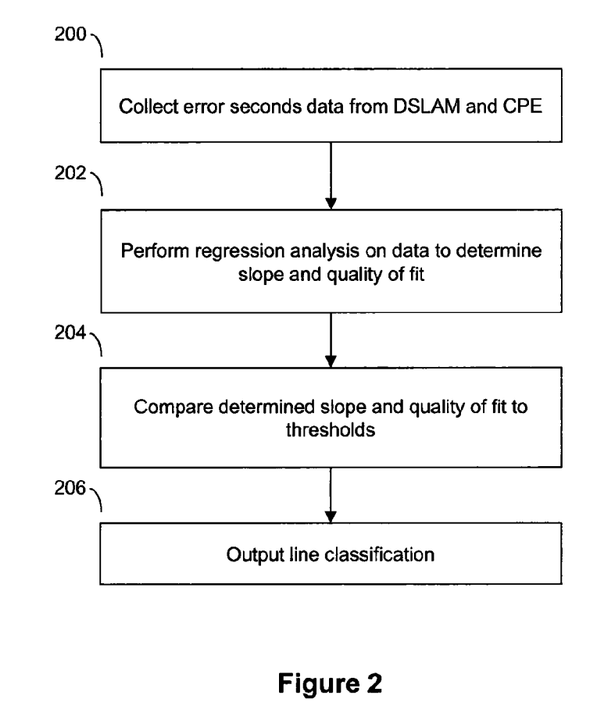
FIG. 2 is a flow chart summarizing the steps of an example of the invention.

FIG. 2 is a flow chart summarizing the steps of the present invention.

In step 200, the fault detection unit 118 gathers event data relating to the near-end errored seconds and far-end errored seconds data from the DSLAM 114 and CPE 124 respectively. In ADSL2+, the information exchange protocol is defined by the DSL standard. In ADSL(1), the protocol used may depend on the manufacturer's implementation. Specifically, the data gathered relates to the number of seconds in each collection period, or time bin or time window, where an un-correctable error has occurred. In this example, the time bins are 900 seconds in duration. The time bin for each collection period thus has a data pair comprising the near-end errored seconds (NE_ES) and far-end errored seconds (FE_ES).

The fault detection unit 118 stores the gathered data in the data store 122. The tables in FIG. 3 and FIG. 4 show some example data stored for two different DSL lines, line A and line B respectively.

Figure 3:
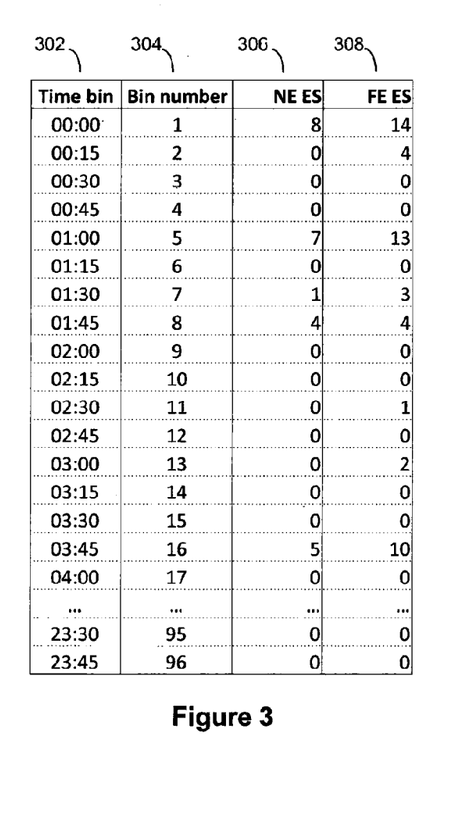
FIG. 3 is a table showing near-end and far-end errored seconds data for a series of time bins for test example line A.
Figure 4:
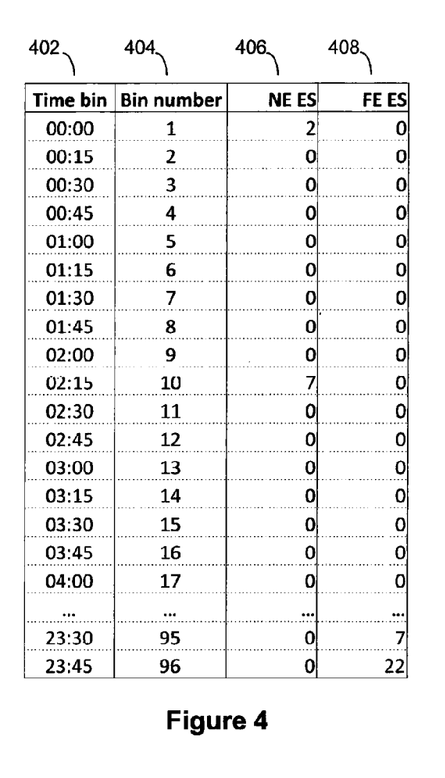
FIG. 4 is a table showing near-end and far-end errored seconds data for a series of time bins for test line B.

The table in FIG. 3 shows data for line A, and has a column for the time bin 302, with data starting at midnight 00:00 hours and every 15 minute interval thereafter until 23:45. This results in 96 time bins or time windows as shown in column 304. Column 306 shows the near-end errored seconds measured within the associated time bin, and similarly column 308 shows the far-end error seconds measured within the associated time bin. The table in FIG. 4 has similar data to FIG. 3, but is for line B.

Figure 5A:
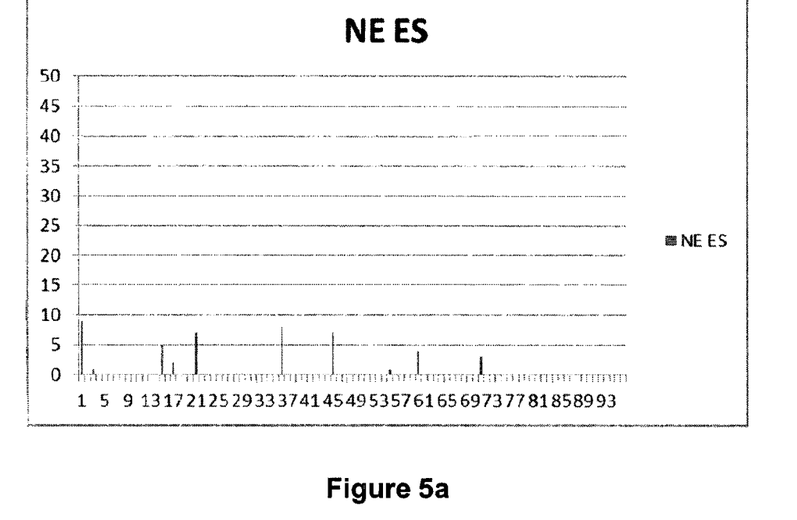
FIG. 5a is a graph of the near-end errored seconds for line A plotted against time bin number.
Figure 5B:
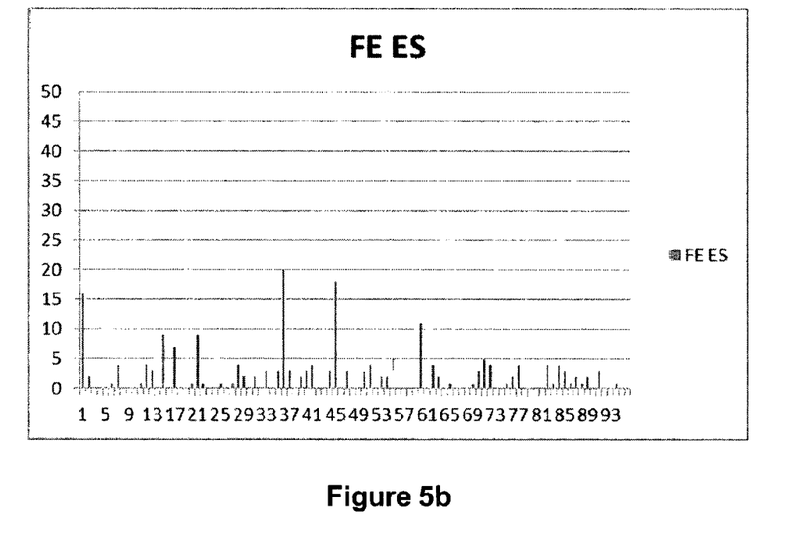
FIG. 5b is a graph of the far-end errored seconds for line A plotted against time bin number.
Figure 6A:
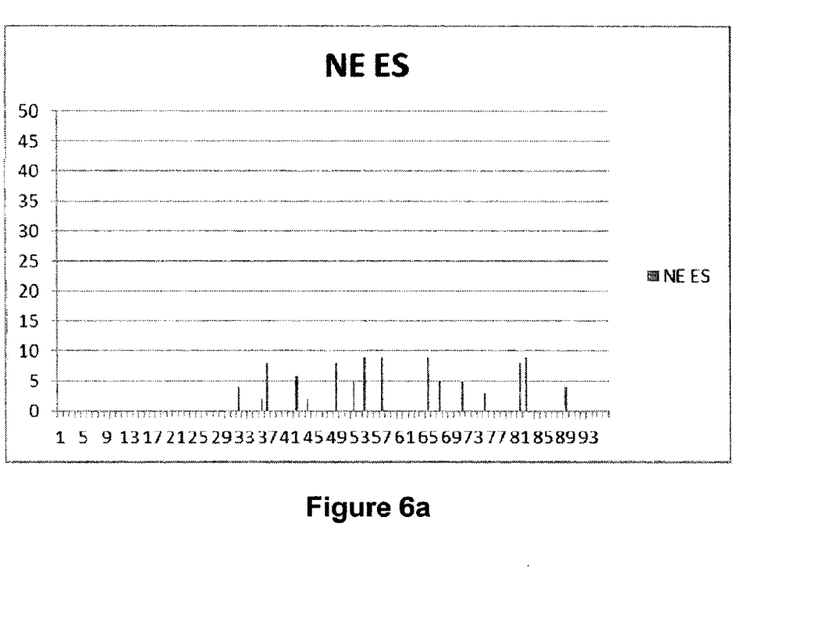
FIG. 6a is a graph of the near-end errored seconds for line B plotted against time bin number.
Figure 6B:
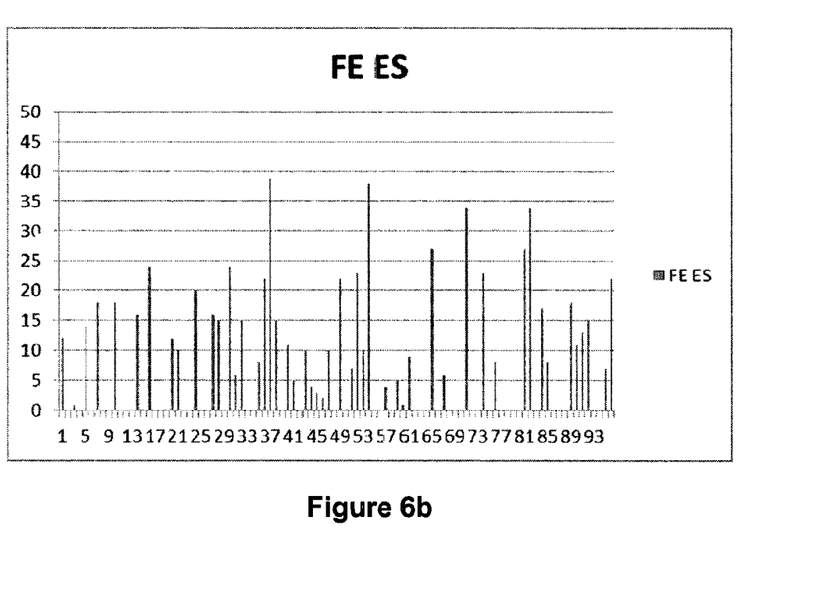
FIG. 6b is a graph of the far-end errored seconds for line B plotted against time bin number.

FIG. 5a shows the near-end errored seconds data for plotted against bin number for line A. FIG. 5b shows the far-end errored seconds data plotted against bin number for line A. Thus, FIGS. 5a and 5b provides a visual representation of the near-end and far-end errored seconds over a period of time. FIGS. 6a and 6b show similar graphs for near-end and far-end errored seconds for line B.

However, it is not straightforward by visual inspection to determine whether the data shown in the tables or the corresponding graphs are correlated. The present invention proposes a method whereby numerical analysis is performed to determine whether a correlation exists, and preferably a statistical method of linear regression analysis is used.

In step 202, the processing unit 120 performs linear regression analysis on the stored data to determine whether the near-end and far-end errored seconds are correlated. The near-end errored seconds data are paired with the far-end errored seconds for the same bin numbers, with the near-end errored seconds set to the X values, and the far-end errored seconds set to the Y values. Linear regression analysis is performed to fit the straight line graph given by equation (1) below:

$$Y = a + bX \quad (1)$$

where a is the intercept, and b is the slope of the straight line graph.

The slope b is determined using equation (2) below:

$$b = \frac{\sum XY - n\overline{X}\overline{Y}}{\sum X^2 - n\overline{X}^2} \quad (2)$$

where n is the number of time bins,
X is the value of the near end error seconds for a time bin,
Y is the value of the far end error seconds for the same time bin,
$\Sigma XY$ is the sum of the product of the X and Y over all of the time bins,
$\Sigma X^2$ is the square of X summed over all of the time bins,
$\Sigma Y^2$ is the square of Y summed over all of the time bins,
$\overline{X}$ is the arithmetic mean of X i.e. the sum of X for all time bins divided by n,
$\overline{Y}$ is the arithmetic mean of Y, and,
$\overline{X}^2$ is square of the arithmetic mean of X.

The intercept a is given by equation (3):

$$a = \overline{Y} - b\overline{X} \quad (3)$$

Using the data for line A (FIG. 3) with the above equations, we obtain a value for a of 1.086, and b of 1.760.

To determine how good a fit the straight line is defined by the variables a and b, we calculate a "quality of fit" parameter, $r^2$, given by equation (4) below:

$$r^2 = \frac{a\sum Y + b\sum XY - n\overline{Y}^2}{\sum Y^2 - n\overline{Y}^2} \quad (4)$$

The term r itself is known as the "product-moment correlation coefficient". He, we have chosen to use the square of r to eliminate negative values.

Values for $r^2$ range from 0 to 1, and can be viewed as an indicator of how well correlated, or degree of correlation between the X and Y values. A value of 0 would indicate no correlation, and a value of 1 would indicate perfect correlation. For line A in this example, using equation (4), we get a value for $r^2$ of 0.795.

Now turning to step 204 of FIG. 2, once the slope b and the quality of fit $r^2$ have been determined, the parameters are compared to thresholds to determine how well the near and far end errored seconds are correlated, and thus whether a line should be classified as exhibiting a fault or not.

In one approach, a fixed threshold of b_threshold is set for the slope b, and a fixed threshold of r2_threshold for the quality of fit parameter $r^2$. b_threshold is used to set a minimum value for acceptable values for a to eliminate false fits e.g. when all X and Y values are 0. Calculated values of b must be >b_threshold. r2_threshold is a predetermined threshold, where any calculated values of $r^2$>r2_threshold are classified as having a "good" quality of fit or correlation, and thus indicative of a potential fault. From testing, it has been found that b_threshold set to 0.01 and r2_threshold set to 0.7 provides good results.

Figure 9A:
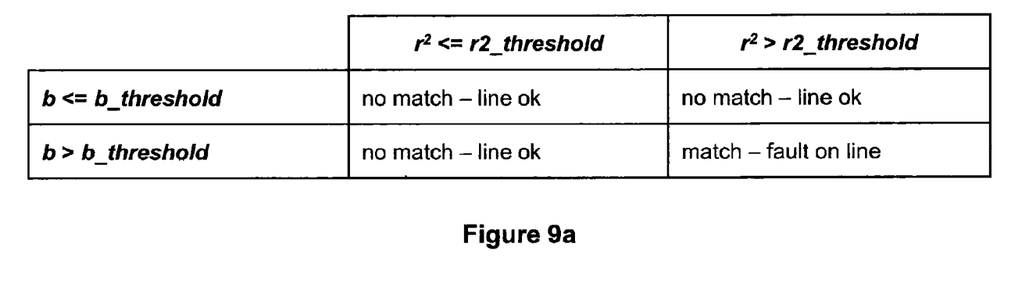
FIG. 9a is a table showing thresholds for b and $r^2$, and resulting line classification.

The table in FIG. 9a shows how a line is classified according to the results of the threshold comparisons. As can be seen, when both b>b_threshold and $r^2$>r2_threshold, the near end and far end errors are deemed sufficiently correlated according to the regression analysis to indicate a fault on the line. The output from the line classification using the thresholds and FIG. 9a is performed in step 206.

Taking line A as an example, b is 1.760, which is greater than b_threshold, and r2 is 0.795, which is greater than r2_threshold. Thus, for line A, the regression analysis results when compared to the thresholds indicate good correlation between the near-end and far-end errors, and thus the line is classified as having a fault.

Figure 7:
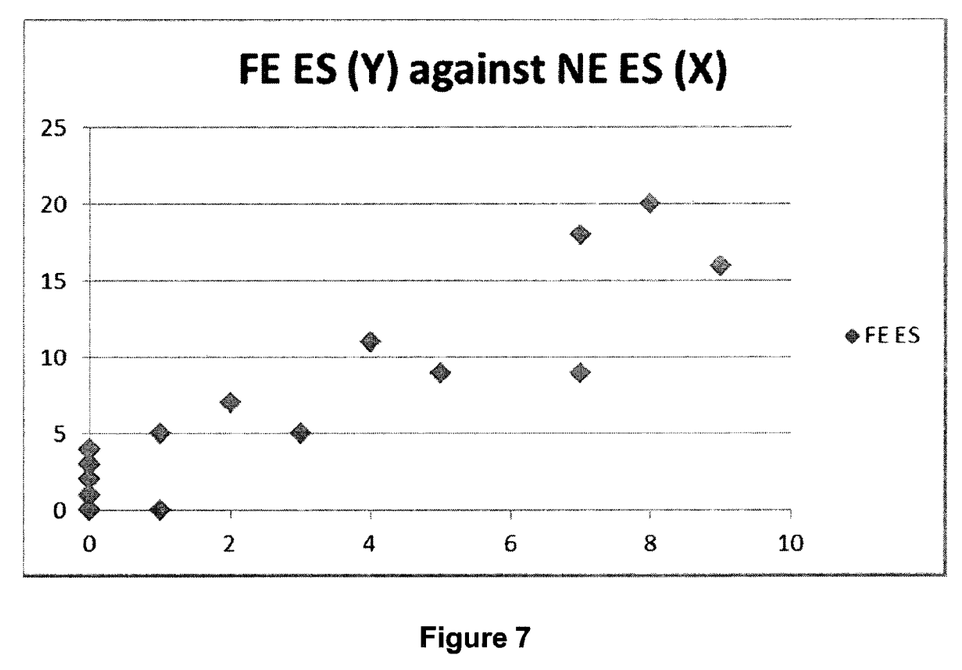
FIG. 7 is a graph of the far-end errored seconds for line A plotted against the near-end errored seconds (associated by common time bin)

FIG. 7 is a graph showing the far-end error seconds (Y) platted against the near_end errored seconds (X) for line A.

Taking line B as an example, the results of the regression analysis are: a=5.143, b=2.033, $r^2$=0.241. Thus, whilst b is greater than b_threshold, r2 is less than r2_threshold. Consequently, according to the method above, the line is uncorrelated or insufficiently correlated and thus the line is classified as not having a fault.

Figure 8:
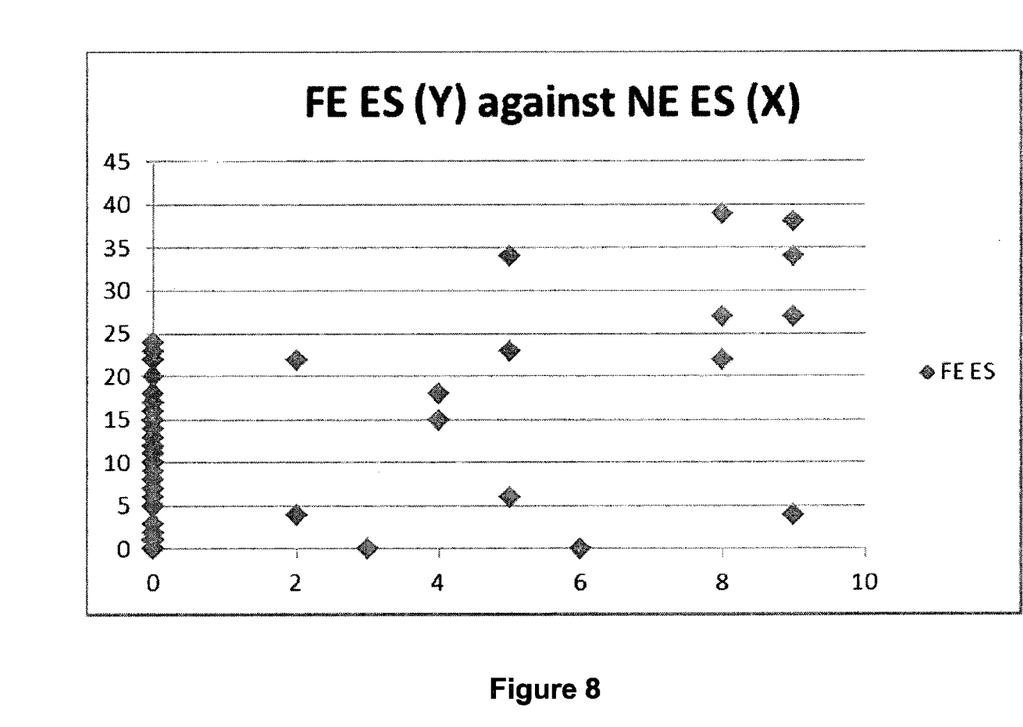
FIG. 8 is a graph of the far-end error seconds for line B plotted against the near-end errored seconds (associated by common time bin)

FIG. 8 is a graph showing the far-end error seconds (Y) platted against the near_end error seconds (X) for line B.

Figure 9B:
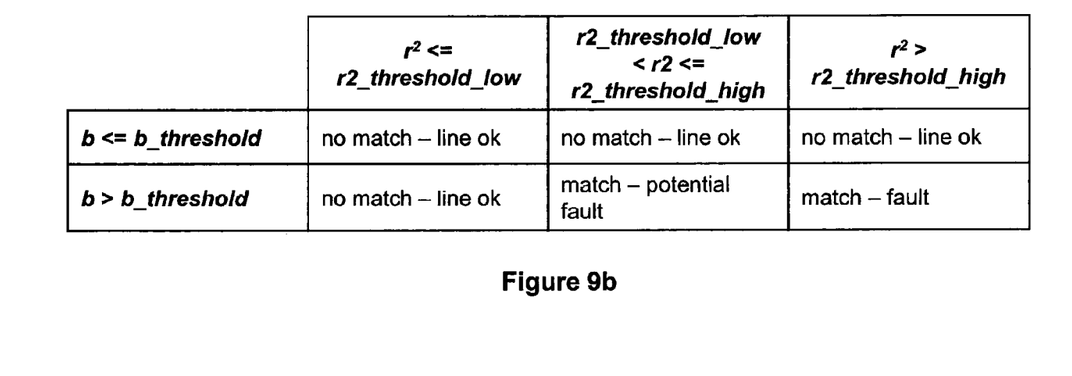
FIG. 9b is a table showing variable thresholds for b and $r^2$, and resulting line classification.

In an alternative approach, multiple thresholds can be used to give a varying classification rather a single threshold that gives fault or no fault. Thus, in an alternative approach, two thresholds are used for the parameter $r^2$: r2_threshold_low and r2_threshold_high. The table in FIG. 9b illustrates how these thresholds are used to give a finer grained classification of a line, based on the quality of fit $r^2$. For example, instead of a fixed threshold for $r^2$ of r2_threshold set at 0.7, a $r^2$_threshold_low is set at 0.3 and $r^2$_threshold_high at 0.7, and where the calculated value of $r^2$ falls relative to these two thresholds will determine how the line is classified. When $r^2$ is less than or equal to $r^2$_threshold_low, the correlation is low, and thus the line is classified as being ok. When $r^2$ lies between $r^2$_threshold_low and $r^2$_threshold_high, the correlation is better, but still not that high, so the line is classified as potentially faulty. When $r^2$ is greater than $r^2$_threshold_high, then the correlation is strong, and thus the line is classified as being faulty.

The values for $r^2$_threshold_low and $r^2$_threshold_high can be determined by analysis of data from actual lines. For example, the value for $r^2$_threshold_low can be identified by running the algorithm across a collection of lines classified as good (i.e. lines where no fault has been reported), and looking for a maximum observed values for $r^2$. A value for $r^2$_threshold_high can be determined by examining lines that have lead-in faults/issue reported (such faults are usually recorded in engineer notes following a resolution), and taking the lower values that are larger than $r^2$_threshold_low.

To understand how the invention works first consider the situation where there is electrical noise in the environment near the CPE. The significant point is the relative level of the wanted DSL signal to the unwanted interfering signal. Signals generated by the CPE (upstream signals) are transmitted along with any induced electrical interference in the DSL line. At the CPE, the level of the wanted signal is much greater than that of the interference. As the signal travels to the DSLAM, both the wanted and interfering signal are attenuated by the same amount, so the relative levels are maintained and few errors will result. In the downstream direction, the signal received from the DSLAM has been attenuated, so the interfering signal near the CPE is of a much higher relative level. This results in decoding errors at the CPE.

This is illustrated in the set of graphs in FIGS. 6a and 6b.

A similar situation occurs when there is significant interference at the DSLAM end of the link, which results in significant near end errors, but few far end errors.

Thus, standard interference problems do not usually give rise to correlated errors.

However, a mechanically unstable joint can cause a momentary interruption to the signal path. This interruption corrupts both upstream and downstream paths at the same time. Consequently both near end and far end errors are seen at the same time, and in proportion to the duration of the interruption. This is illustrated in FIGS. 5a and 5b where there is a time correlation between the timing and counts of the errors (along with some errors from electrical interference that is not time correlated between the two channels). Although mechanically unstable joints could, in principle, occur at any joint along the circuit, the typical location is near the customer premises, especially where there are external drop wires or jointing boxes.

Whilst the above example has been described with reference to errored seconds at the near-end and far-end, other error parameters can be used instead at the near-end and far-end. These include (at near end and far end): forward error corrector event count; CRC error event count; forward error corrector seconds (how many seconds contain an FEC error); severely errored seconds (how many seconds contain more than a threshold number of uncorrectable error events); loss of frame seconds (number of seconds where a frame is lost).

The above alternative parameters can be used in a similar manner to the errored seconds in the main example, and can be similarly harvested from the DSLAM and CPE. All these parameters, including errored seconds, can be considered to be examples of error instances.

In an alternative example, separate fault detection units 118 can reside in each of the CPEs for use in performing the operation of steps 200 to 206 to identify a fault on a line. The individual fault detection units will need to be provided with the data from the DSLAM and also hold threshold values locally. Similarly, the fault detection unit may reside in a handheld tester used by field engineers, instead of in the CPE or DSLAM. The same method can be used in such a handheld tester, again based on steps 200 to 206 of the above method.

Exemplary embodiments of the invention are realised, at least in part, by executable computer program code which may be embodied in an application program data. When such computer program code is loaded into the memory of the processor 120 in the fault detection unit 118, it provides a computer program code structure which is capable of performing at least part of the methods in accordance with the above described exemplary embodiments of the invention.

A person skilled in the art will appreciate that the computer program structure referred to can correspond to the flow chart shown in FIG. 2, where each step of the flow chart can correspond to at least one line of computer program code and that such, in combination with the processor 120 in the fault detection unit 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of identifying a fault in a digital subscriber line in a telecommunications network, said method comprising:
   i) determining near-end error instances and far-end error instances associated with the digital subscriber line measured over a period of time;
   ii) determining the degree of correlation between the near-end error instances and the far-end error instances;
   iii) identifying a fault on the digital subscriber line in dependence on the determined degree of correlation;
   wherein,
   determining the degree of correlation comprises numerical analysis of the error instances, and wherein the error instances are counts of error occurrences.

2. A method according to claim 1, wherein the period of time comprises a plurality of time windows, with a value for the near-end error instances and a value for the far-end error instances associated with each time window.

3. A method according to claim 1, wherein the error instances are errored seconds.

4. A method according to claim 3, wherein an errored second is a second of data transmission on the digital subscriber line where an uncorrectable error has occurred.

5. A method according to claim 1, wherein the numerical analysis comprises regression analysis on the near end and far end error instances to determine a quality of fit parameter.

6. A method according to claim 1, wherein the near-end error instances are error instances measured at the network end of the digital subscriber line, and the far-end error instances are the error instances measured at the customer end of the digital subscriber line.

7. A method according to claim 1, wherein identifying a fault comprises comparing the determined correlation to a threshold.

8. A fault detection unit for identifying a fault in a digital subscriber line in a telecommunications network, fault detection unit adapted to:
   determine near-end error instances and far-end error instances associated with the digital subscriber line measured over a period of time;
   determine the degree of correlation between the near-end error instances and the far-end error instances;
   identify a fault on the digital subscriber line in dependence on the determined degree of correlation;
   wherein,
   the fault detection unit is adapted to determine the degree of correlation using numerical analysis of the error instances, and wherein the error instances are counts of error occurrences.

* * * * *